Aug. 23, 1938.  J. D. WALLACE  2,127,545
RADIO FREQUENCY CURRENT MEASURING DEVICE
Filed Oct. 4, 1937
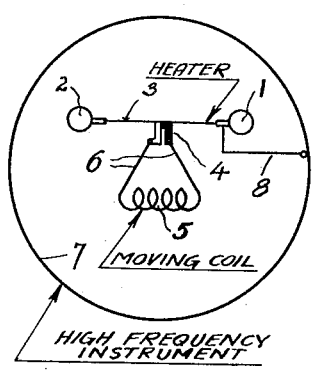
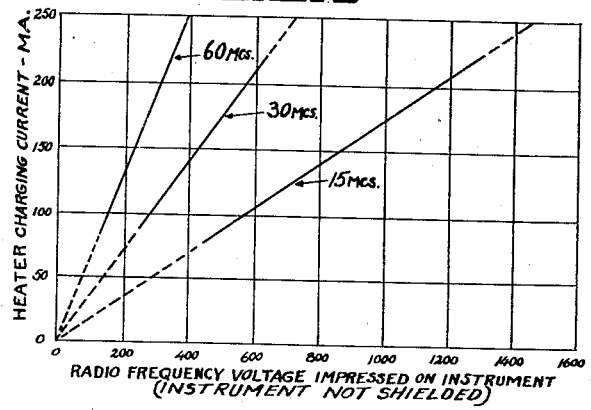
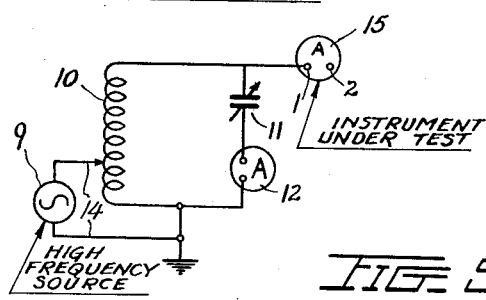
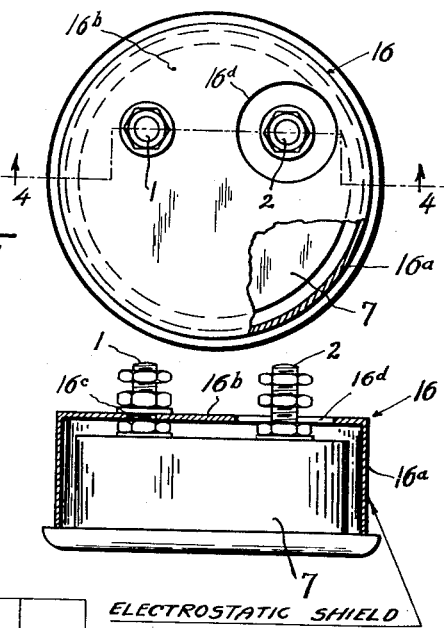
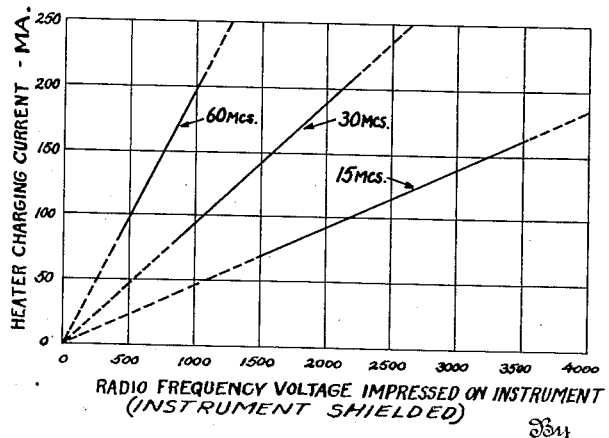
Inventor
JAMES D. WALLACE.
By Robert A. Lavender
Attorney Patented Aug. 23, 1938

2,127,545

UNITED STATES PATENT OFFICE 2,127,545

RADIO FREQUENCY CURRENT MEASURING DEVICE

James D. Wallace, Washington, D. C.

Application October 4, 1937, Serial No. 167,156

11 Claims. (Cl. 171—95)

(Granted under the act of March 3, 1883, as amended April 30, 1928; 370 O. G. 757)

My invention relates broadly to high frequency devices, and more particularly to an improvement in the construction and operation of high frequency ammeters.

One of the objects of my invention is to provide means for measuring the magnitude of radio frequency currents to a higher degree of precision than has been previously attained, particularly when a determination of current is desired at a point in a radio frequency circuit which is considerably higher in radio frequency potential than are the surrounding objects.

Another object of my invention is to provide means for the protection of instruments from damage which sometimes results from their operation in circuits at a very high radio frequency potential with respect to other objects in the proximity.

Still another object of my invention is to provide a form of electrostatic shield which may be mounted directly on one terminal of the high frequency measuring instrument without interfering with the standard type of construction thereof.

A further object of my invention is to provide shield means in combination with a high frequency ammeter and connected with a terminal of said ammeter to be connected directly to the source of current whereby stray currents in the ammeter elements are conducted directly from the source to low potential objects in the proximity and do not pass through the ammeter.

A still further object of my invention is to provide shield means cooperative with enclosure frame members such as the usual metallic scale and the bezel ring which are electrically bonded together for substantially wholly isolating the indicating mechanism from stray high frequency currents liable to produce error in the indications and damage to sensitive actuating means.

Other and further objects of my invention will be seen more clearly from the discussion given subsequently in the disclosure, with reference to the accompanying drawing, of which the following is a specification:

Figure 1 represents schematically the construction of a radio frequency ammeter; Fig. 2 illustrates schematically a circuit arrangement used in applying radio frequency potentials unilaterally to instruments; Fig. 3 graphically shows "heater charging current" test data for a conventional radio frequency current measuring instrument; Fig. 4 is a sectional view on line 4—4 in Fig. 5, with parts shown in elevation; Fig. 5 is a rear elevational view, of an improved high frequency current measuring instrument showing an electrostatic shield in combination with the instrument in accordance with my invention; and Fig. 6 graphically shows "heater charging current" test data for a radio frequency current measuring instrument with the instrument shield attached in accordance with my invention.

An introductory discussion pertaining to this subject will first be presented in order to indicate the need for the improvement to be disclosed subsequently, as well as to facilitate an understanding of its theory of operation. Experience with various kinds of radio equipment employing radio frequency current measuring instruments placed at points in a circuit at high radio frequency potential with respect to other objects in the proximity, leads one to conclude that a considerable error in the current measurement is introduced, which is not present when such an instrument is employed at a point in circuits at or near ground potential. This conclusion is reached because various computations based on current measurements at high potential points give results which are entirely incompatible with known physical principles; and from various test data it is possible to determine that the instrument indicates more current, frequently considerably more, than is actually flowing in the circuit.

A theoretical explanation of this effect will be offered. The illustration in Fig. 1, while not an actual drawing of an instrument, shows diagrammatically certain parts and connections within a commonly used radio frequency ammeter of the thermocouple type, and reference to this drawing will facilitate an understanding of the subsequent discussion. Reference characters 1 and 2 indicate the instrument terminals; 3, the heater; 4, the thermocouple; 5, the moving coil of the indicating mechanism, hair springs, etc.; 6, the connecting leads between the moving coil mechanism at 5 and the thermocouple at 4; and 7, all other metallic parts consisting of the permanent magnet, bezel ring, scale (if of metallic construction) etc., all of which are electrically bonded and connected to one of the terminals as indicated at 8. These elements are interconnected to prevent radio frequency "flash-over" between parts, as an internal "flash-over" would likely occur between certain parts, were they not electrically connected, in applications wherein the instrument must be operated at a radio frequency potential much higher than that of the surrounding objects.

The structure of the various members indicated generally at 7 does not allow them to act as an electrostatic shield between the heater, at 3, and other nearby objects external to the instrument. For this reason there is a direct capacity path between the heater and certain associated parts (the connecting leads, hair springs, moving coil, etc.), and external objects, which allows the flow of a charging current in the heater, when the instrument is operated at high radio frequency potential with respect to the surrounding objects.

This current may be designated as the "heater charging current". Therefore, when used under such operating conditions, the instrument would indicate not only the current through a load but the "heater charging current" as well, and obviously an error in current measurement would thereby be introduced. In addition, it appears likely that the portion of "heater charging current" which leaves the heater and flows through the thermocouple into the leads, hair springs, moving coil, etc., may under certain operating conditions, especially at very high frequencies, become sufficiently great to destroy the thermocouple. From actual experience, it has been found that instruments have been damaged in operation for which only this explanation will suffice.

While the foregoing analysis of the action of instruments at high radio frequency potential is based entirely on theory, experiments have been made which provide a method of verifying the theory, furnish results proving the theory to be valid, and indicate that certain errors in current measurements do result at commonly used radio frequencies.

A direct measurement of "heater charging current" may be obtained by making a unilateral connection from a source of radio frequency voltage to one terminal of an instrument, the magnitude of the "heater charging current", if appreciable, being determined directly from the resulting instrument reading. It is necessary to connect the source of voltage to the low potential terminal of the instrument, which by inspection of the illustration in Fig. 1 is readily seen to be the terminal at 1, for if the connection were made to the other terminal, not only would the charging current flowing through the heater be indicated, but also that conducted to the magnet, scale, and other associated metallic parts, and it is therefore obvious why the terminal at 1 should be selected for connection to the source of radio frequency voltage.

The circuit arrangement used in applying a radio frequency voltage to an instrument is shown in Fig. 2. In this illustration, reference character 9 indicates a source of high frequency power; 10, an inductance coil; 11, a variable calibrated condenser, which with the inductance at 10 forms a tuned circuit which may be resonated in frequency with that of the power source at 9; 12, a radio frequency ammeter for determining the radio frequency current in the tuned circuit; 14, a suitable transmission line for coupling the power source and the tuned circuit; and 15, the radio frequency instrument in which it is desired to measure the "heater charging current". The instrument at 15, in Fig. 2, utilizes the terminal designated at 1, as in Fig. 1, in making the unilateral connection to the high potential side of the tuned circuit.

By means of the circuit illustrated in Fig. 2, the instrument at 15 under test may be operated at a very high radio frequency potential relative to ground or the surrounding objects. In accordance with the stated theory, it has been found that the application of radio frequency voltage in this manner actually produces a measurable reading on the instrument under test which is the "heater charging current". The voltage applied to the instrument under test may be computed by well known electrical laws, from the capacity of the tuning condenser, the frequency, and the circulating current in the tuned circuit, which may be determined from the ammeter at 12.

Some test data obtained from this experiment are shown in Fig. 3 in graphic form. Along the abscissae of these graphs are shown the values of radio frequency voltage applied unilaterally to the instrument under test, and along their ordinates are shown the corresponding values of "heater charging current" directly shown on the instrument. It will be noted that test data have been obtained at 15, 30 and 60 megacycles. These data were taken from a conventional, well-designed, 3½ inch diameter, switchboard mounting, thermocouple type of instrument, the full scale range of which was 250 milliamperes. From an inspection of the data it is not difficult to ascertain that the value of resulting "heater charging current" is proportional both to the voltage above ground at which the instrument is operated and to the applied frequency. From well known electrical laws it is apparent that the circuit equivalent of the unilaterally connected instrument is in the nature of a capacity, and it may be readily shown that a condenser of 1.8 micromicrofarads will pass a current substantially equal to the "heater charging current", if similar voltages at the same frequencies were applied to this condenser. Thus it may be seen that the effective heater capacity of this instrument is of a magnitude sufficiently great to allow the introduction of a considerable error when it is operated at high potential, as the indication due to "heater charging current" would be added to that resulting from the current through the load circuit in conjunction with which the instrument was being used.

From the magnitude of the "heater charging current" obtained at voltages and frequencies which are moderate in view of what is frequently encountered in various types of radio transmitters, it is not difficult to realize that many applications would normally subject an instrument to values of heater charging current which would destroy the heater or thermocouple. It is therefore apparent that the use of any means for materially reducing the value of "heater charging current" would be valuable. The device of my invention has proved highly effective in this respect in both experimental and actual operation, as will now be particularly described.

In the device of my invention, I enclose the instrument mechanism in an equi-potential screen which materially reduces the value of "heater charging current", as the capacity path between the instrument heater, together with its associated parts, and other objects in the proximity at a lower radio frequency potential is substantially reduced. This screen is preferably electrically connected to some part of the instrument in order that there may be no appreciable radio frequency potential difference between the instrument and the screen. From an inspection of Fig. 1, it is apparent that the most advantageous point of connection is the terminal at 1.

In Figs. 4 and 5, I have illustrated one form of shield applicable to instruments of the form shown. The shield is designated by reference character 16 generally, and comprises a skirt portion 16a integral with a disc portion 16b which is apertured at 16c for mounting and connection at the terminal 1 as shown, and also at 16d for passing the terminal 2, the aperture 16d being of a size sufficient to clear the terminal 2 without making contact therewith. The shield may be made of any conducting material, with the possible exception of magnetic materials; the shields that have actually been employed were made of brass.

It has been noted that the shield is electrically connected to one of the instrument terminals, whereas the other one is accessible through an aperture in the shield for connection in the circuit in which it is desired to measure high frequency current. The terminal to which the shield is attached being the one designated at 1 in Fig. 1, the instrument magnet, bezel ring, and scale (which was of metallic construction in instruments used in my experiments), indicated generally by reference character 7, in conjunction with the shield 16, form an equi-potential screen about the instrument heater, and in effect therefore materially limit the heater charging current, and allow the instrument to be used with a higher degree of precision at high potential points than is possible without the use of the shield.

In order to verify the effect of the shield in actually improving the operation of the instrument, values of "heater charging current" with the shield attached were determined at various applied voltages and frequencies in the same manner as previously described in relation to Fig. 3. The test data are shown graphically in Fig. 6, and when comparing these graphs with those shown in Fig. 3, which were obtained with the unshielded instrument, attention is directed to the fact that the abscissæ scale in the case of Fig. 6 covers a much greater range of voltage than is shown in the case of Fig. 3. A comparison of these data indicates that qualitatively the effects are the same either with or without the shield, but that the shield materially reduces the "heater charging current" under similar operating conditions; likewise it may be stated that the effective heater capacity with the shield attached is approximately 0.51 micromicrofarad as compared with the 1.8 micromicrofarads without the shield. From this reduction in effective heater capacity, it is apparent that the error in current indication due to operation at high potential is reduced by use of the shield to 28% of what it would be without the use of the shield. Also, it is seen that an instrument with a shield attached could be used in circuits at higher potentials than are possible without the use of the shield, as the "heater charging current" is much less in the former case and the possibility of damage is minimized.

Some test data on several radio frequency current measuring instruments will be shown below indicating how much reduction in effective heater capacity is usually attained by use of the shield. The 250 milliampere instrument on which tests have been previously described is designated as No. 3 in the following table.

Table 1

| Instrument No. | Instrument range | Effective heater capacity— | |
|---|---|---|---|
| | | Without shield | With shield |
| | | Mmf. | Mmf. |
| 1 | 0–125 ma. | 0.5 | 0.14 |
| 2 | 0–150 ma. | 0.6 | 0.17 |
| 3 | 0–250 ma. | 1.8 | 0.51 |
| 4 | 0–250 ma. | 0.7 | 0.14 |
| 5 | 0–500 ma. | 1.7 | 0.45 |
| 6 | 0–500 ma. | 0.5 | 0.12 |
| 7 | 0–1 ampere | 0.7 | 0.1 |

Thus it is seen that a material reduction in "effective heater capacity" is attained in all cases.

The question may arise as to whether the application of the shield, while reducing the error due to operation at high potential, may not actually increase other types of errors, and some test data are shown concerning the accuracy of the instruments when operated at ground potential both with and without the shield. These tests were made with the instruments as near ground potential as possible in order to prevent the error due to high potential operation from confusing the issue, for it is realized that the instruments with and without the shield will not have the same error at high potential. In the following table the numbers designating the instrument correspond to the same numbers in Table 1.

Table 2

| Instrument No. | Instrument range | Error at 100 megacycles— | |
|---|---|---|---|
| | | Without shield | With shield |
| | | Percent | Percent |
| 1 | 0–125 ma. | −14 | −9 |
| 2 | 0–150 ma. | −19 | −9 |
| 3 | 0–250 ma. | −22 | −13 |
| 4 | 0–250 ma. | −8 | −7 |
| 5 | 0–500 ma. | −8 | −8 |
| 6 | 0–500 ma. | −6 | −6 |
| 7 | 0–1 ampere | −9 | −9 |

The significance of the negative sign before the percentages of error is that the above percentages should be deducted from the reading of the instrument to obtain the true current. Thus it may be seen that even at low potential less error is obtained with the shield than without. It may have been expected that if the shield did not introduce basic errors, it would not alter the error at all under the conditions of the measurements; and the reason why the error is reduced lies probably in the fact that although an effort was made to operate the instruments at ground potential, due to the difficulty of obtaining suitable grounds at 100 megacycles an imperfect ground was present, and the instruments were actually somewhat above ground potential while under test. For this reason, the use of the shield seems desirable even at points near ground potential.

It is to be understood that the shield may be incorporated structurally within the instrument, as well as being attached externally, without altering the nature or scope of the fundamental conception.

My technical associates and I have found this device entirely practical and very useful for many types of applications. Thus, while I have described my invention in certain preferred embodiments, I desire that it be understood that modifications may be made by those skilled in the art and that no limitations upon my invention are intended other than are imposed by the scope of the appended claims.

The invention described herein may be manufactured and used by and for the Government of the United States for governmental purposes without the payment of any royalty thereon.

What I claim as new and desire to secure by Letters Patent of the United States is as follows:

1. In combination, a meter device for measuring high frequency current, and equi-potential screen means mounted on said device for shielding the operating mechanism of said device to reduce the flow of charging current therein to reduce the error when operating the instrument at radio frequency voltages considerably different from ground potential.

2. In combination, a thermo-electric meter device for measuring high frequency current, and equi-potential screen means mounted on said device for shielding the operating mechanism of said device to reduce the heating effect of stray currents and the probability of damaging the instrument when operated at a point in a circuit at radio frequency voltage considerably different from ground potential.

3. A high frequency ammeter comprising a heater element adapted to conduct load current at high potential, a thermocouple device operative in accordance with the heating of said element for determining the load current magnitude, and electrostatic shield means for said element likewise at high potential for eliminating stray high frequency currents therefrom which produce heating therein and consequent error in the load current determination.

4. A high frequency ammeter comprising a galvanometer, a heater element adapted to conduct load current at high potential, a thermocouple device adjacent thereto and connected with the actuating coil of said galvanometer for determining the load current magnitude, in accordance with heating of said element, and equi-potential electrostatic shield means for said element, said thermocouple device and said galvanometer, for eliminating stray high frequency currents therefrom which produce error in the determination of said load current.

5. A high frequency ammeter comprising a heater element adapted to conduct load current at high potential, a thermocouple device in metallic connection therewith for operation in accordance with the heating of said element to determine the load current magnitude, and equi-potential electrostatic shield means for said element and said thermocouple device for eliminating stray high frequency currents from said element and said thermocouple device which produce error in the determination of said load current and constitute a possible cause of damage to said thermocouple device at high potential points in the high frequency stray field.

6. A high frequency ammeter comprising a heater element connected to terminals adapted to be connected between a high frequency source and a load circuit at high potential, a thermocouple device and indicating mechanism cooperative with said element for determining the load current magnitude in accordance with the heating of said element, and an electrostatic shield device mounted on and in electrical connection with one of said terminals at high potential for conducting stray high frequency currents directly from the source and eliminating error in the current indications due to said stray currents in the ammeter.

7. A high frequency ammeter comprising a heater element connected to terminals adapted to be connected between a high frequency source and a load circuit at high potential, indicating means operative in accordance with the heating of said element, conductive material in the frame of said ammeter and in said indicating means being electrically bonded together and connected with the terminal adapted to be connected directly to the source, and an electrostatic shield device mounted on and in electrical connection with the same said terminal.

8. A high frequency ammeter having terminals adapted to be connected between a high frequency source and a load circuit at high potential, conductive material in the body of said ammeter being electrically bonded together and connected with the terminal adapted to be connected directly to the source, and an electrostatic shield device mounted on and in electrical connection with the same said terminal.

9. A high frequency ammeter having terminals adapted to be connected between a high frequency source and a load circuit at high potential, and an electrostatic shield device for said ammeter in electrical connection with the terminal adapted to be connected directly to the high frequency source.

10. A high frequency ammeter having terminals disposed beside each other and adapted to be connected between a high frequency source and a load circuit, and an electrostatic shield device mounted on and in electrical connection with one of said terminals and having an enlarged aperture therein for passing the other of said terminals, said shield device being adapted to be connected directly with said source through the first said terminal, and the other of said terminals being accessible for connection to the load circuit.

11. A high frequency electrical measuring instrument having terminals disposed beside each other, and an electrostatic shield device mounted on and in electrical connection with one of said terminals and having an enlarged aperture therein for passing the other of said terminals.

JAMES D. WALLACE.